(12) United States Patent
Mailaender

(10) Patent No.: US 7,667,648 B2
(45) Date of Patent: Feb. 23, 2010

(54) FACILITATING MOBILE STATION LOCATION USING A GROUND-BASED CELLULAR NETWORK

(75) Inventor: Laurence E. Mailaender, New York, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/761,513

(22) Filed: Jun. 12, 2007

(65) Prior Publication Data

US 2008/0309557 A1 Dec. 18, 2008

(51) Int. Cl.
*G01S 3/02* (2006.01)

(52) U.S. Cl. ....................... 342/463; 342/457

(58) Field of Classification Search ............ 342/450, 342/457, 463–465; 455/456.1, 456.5, 456.6
See application file for complete search history.

(56) References Cited

U.S. PATENT DOCUMENTS

| | | | | |
|---|---|---|---|---|
| 6,067,018 A * | 5/2000 | Skelton et al. | ........... | 340/573.3 |
| 2004/0002347 A1* | 1/2004 | Hoctor et al. | ............ | 455/456.1 |
| 2005/0176443 A1* | 8/2005 | Halsey | ............ | 455/456.5 |
| 2006/0071790 A1* | 4/2006 | Duron et al. | ............ | 340/572.1 |
| 2008/0039066 A1* | 2/2008 | Laroia et al. | ............ | 455/422.1 |

FOREIGN PATENT DOCUMENTS

| | | |
|---|---|---|
| EP | 1688757 A2 | 11/2008 |
| WO | 9948233 | 9/1999 |
| WO | 02082850 A1 | 10/2002 |

OTHER PUBLICATIONS

International Search Report and Written Opinion of the International Searching Authority for International application No. PCT/US2008/007201 mailed Oct. 23, 2008.
International Preliminary Report on Patentability for International application No. PCT/US2008/007201 mailed Sep. 10, 2009.

* cited by examiner

*Primary Examiner*—Dao L Phan
(74) *Attorney, Agent, or Firm*—Carlson, Gaskey & Olds PC

(57) ABSTRACT

Communications facilitate locating a mobile station (22) using the radio frequency spectrum typically used for cellular communications. A first locating signal is communicated between a base station transceiver (30, 32) and a mobile station (22) and includes information regarding the location of the signal source. A plurality of second locating signals are communicated between a corresponding plurality of ranging beacon devices (40, 42, 44) and a mobile station (22) and each includes information regarding the location of the ranging beacon devices (40, 42, 44). The first and second signals allow for determining the location of the mobile station (22). In a disclosed example, the first and second signals are simultaneously transmitted by the base station (30, 32) and the plurality of ranging beacon devices (40, 42, 44), respectively.

17 Claims, 3 Drawing Sheets

FACILITATING MOBILE STATION LOCATION USING A GROUND-BASED CELLULAR NETWORK

FIELD OF THE INVENTION

This invention generally relates to communication. More particularly, this invention relates to facilitating locating mobile communication devices.

DESCRIPTION OF THE RELATED ART

Wireless communication systems are well known and in widespread use. Typical systems are divided into geographic regions referred to as cells. A base station transceiver provides wireless communication coverage within a cell and typically services several sectors within a cell. There are various communication protocols that are useful within cellular communication systems.

There are various reasons to want to locate a mobile station. For example, emergency 911 services require being able to locate the source of a call for purposes of dispatching response personnel to the appropriate location. Another use of location capability is to locate or track valuable assets whether they are being legitimately carried about or have been stolen, for example. Another use of location information would be to provide a map of a current vicinity or offer other location-based services to wireless communication subscribers.

There are two primary methods of locating a device such as a mobile station. One is based on a global positioning system (GPS) approach that relies upon a network of satellites in space. The satellites provide ranging signals that can be detected for purposes of geo-location using known triangulation techniques, for example. Under favorable circumstances, a GPS approach provides rapid and high-accuracy location. GPS approaches are not useful for all cellular communication scenarios, however, because of the inability for a mobile station to detect enough satellites under various conditions. For example, in so-called urban canyons and inside of buildings, typical mobile stations (even if they have GPS capability) are not able to detect a sufficient number of satellite signals for purposes of making a location determination. Under some conditions, therefore, GPS receivers are unable to provide location information. Even the high-sensitivity GPS receivers that may be able to provide some additional GPS coverage have associated location errors (e.g., 20 meters or more), which are not acceptable for many applications.

Another approach is referred to as assisted GPS (A-GPS). A cellular network can aid a GPS receiver by helping it to detect weaker GPS signals. A-GPS techniques include a GPS-enabled location server that is connected with the cellular network. The server is able to determine what satellites are in view in the general vicinity of the mobile station, the satellites' Doppler and delay parameters and their NAV messages. The server provides this data to the A-GPS mobile station over the cellular link. This A-GPS information aids the reception of GPS satellite signals in situations where it is otherwise difficult for a mobile station to directly detect the satellites on its own. One limitation to A-GPS is that the accuracy is typically not significantly better than GPS and may not satisfy the need for precise positioning.

It may be possible to locate a mobile station based primarily upon triangulation of the cellular base station transceiver signals that are received by the mobile station. In many situations, a mobile station will not be able to detect weak satellite signals, but may be able to detect nearby cellular base stations. Typically, unmodified cellular signals are used as the basis of the location procedure. A potential shortcoming with trying to use this approach is that a mobile station typically cannot simultaneously detect sufficiently strong signals from enough base station transceivers to make an accurate location determination. For example, at least three and preferably at least four different signals sources are required for accurate geolocation. Determination of the mobile station's height (altitude) is particularly difficult as the signal sources may themselves not differ significantly in the height dimension.

It would be useful to be able to locate mobile stations more accurately and more consistently.

SUMMARY

An exemplary method of facilitating locating a mobile station includes communicating a first location signal between at least one base station transceiver and a mobile station. A plurality of second locating signals are communicated between a corresponding plurality of ranging beacon transmitters and the mobile station. The first and second signals each include information regarding the location of the corresponding signal source. The first and second signals facilitate locating a mobile station.

In a disclosed example, locating signals are coordinated with the usual cellular communications signals to allow user communications and location functions to co-exist in the same radio bandwidth. Further, the location signals are themselves coordinated to minimize their mutual interference.

The various features and advantages of this invention will become apparent to those skilled in the art from the following detailed description. The drawings that accompany the detailed description can be briefly described as follows.

DETAILED DESCRIPTION

Figure 1:
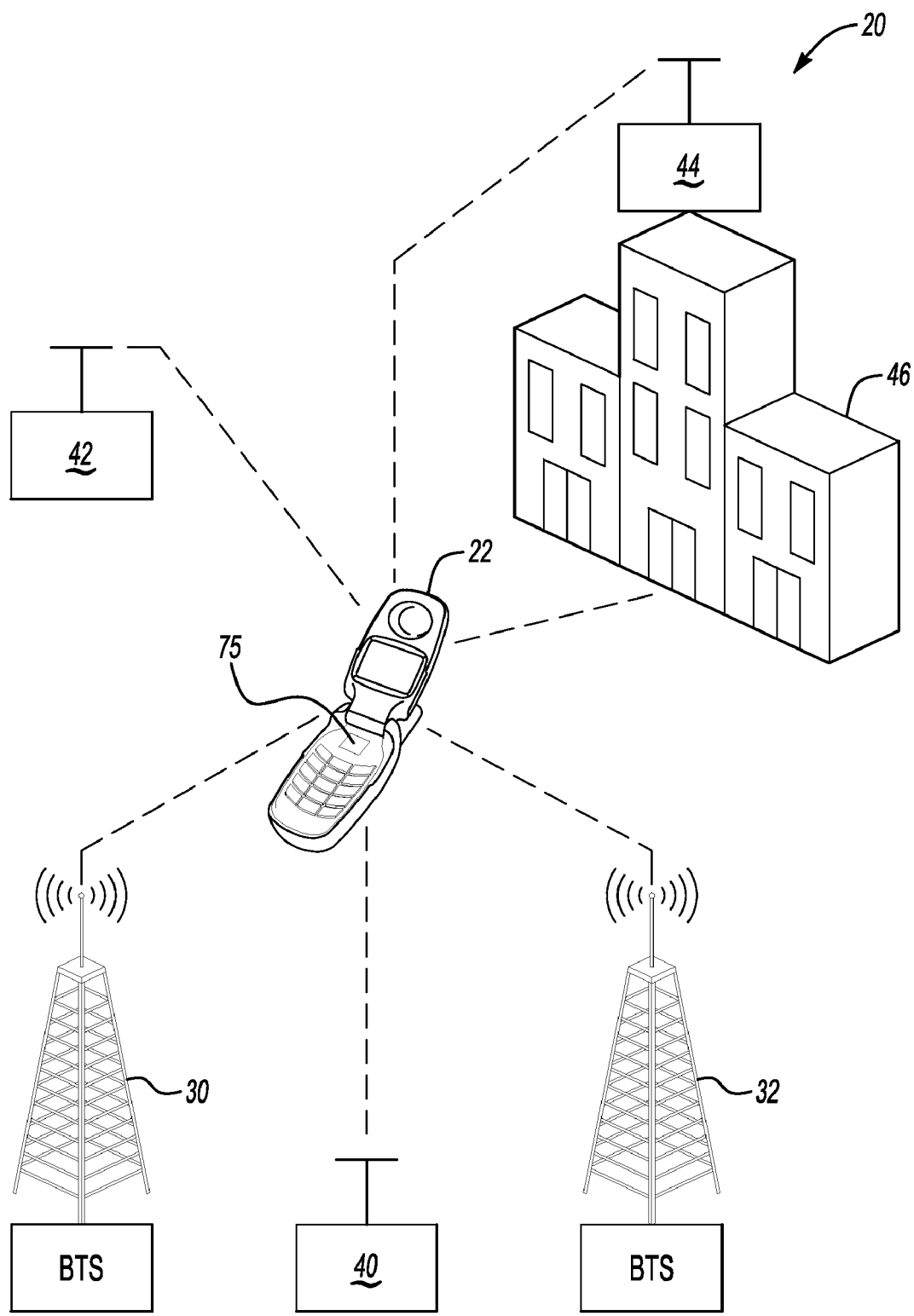
FIG. 1 schematically illustrates selected portions of a wireless communication system useful with an embodiment of this invention.

Disclosed examples facilitate locating a mobile station using cellular network-based signaling. FIG. 1 schematically illustrates an example wireless communication system 20 that allows a mobile station 22 to be used in a generally known manner for conducting wireless communications. The mobile station 22 communicates over conventional radio frequency links with a base station transceiver (BTS) 30, for example, to conduct voice, data or other forms of wireless communication. The BTS 30 is associated with a wireless communication network to facilitate communications between the mobile station 22 and another device.

The illustrated example includes another BTS 32, which may be part of the mobile station's active set depending on the ability of the mobile station 22 to detect signals from the BTSs 30 and 32 at the same time. Each of the example base station transceivers 30, 32 are used for conventional wireless communications.

The illustrated BTSs 30, 32 are also useful for facilitating locating the mobile station 22. Each of the BTSs 30, 32 also provide location signals that can be detected by the mobile station 22. The location signals include information regarding the location of each BTS. Because the mobile station 22 is likely not able to simultaneously detect signals from enough BTSs to make an accurate location determination, the illustrated example includes a plurality of ranging beacon transmitter devices 40, 42 and 44. The ranging beacon transmitter devices are strategically located within geographic areas where mobile station location services are desired. In one example, the ranging beacon transmitter devices are referred to as pseudolites. The ranging beacon transmitter devices 40, 42 and 44 provide location signals that can be received by the mobile station 22 for purposes of making location determinations. The location signals from the ranging beacon transmitter devices 40, 42 and 44 include location information regarding the corresponding transmitter.

In the illustrated example, the ranging beacon transmitter 44 is supported on top of a building 46. One feature of such an arrangement is that different elevations for different ranging beacon transmitters allows for a mobile station 22 to determine longitude, latitude and elevation location information.

When the mobile station 22 is able to detect a sufficient number of locating signals from at least one BTS and a plurality of ranging beacon transmitters, the mobile station 22 can use known geo-location algorithms for determining the location of the mobile station. With the cellular, ground-based approach, satellite signals are not required.

Figure 2:
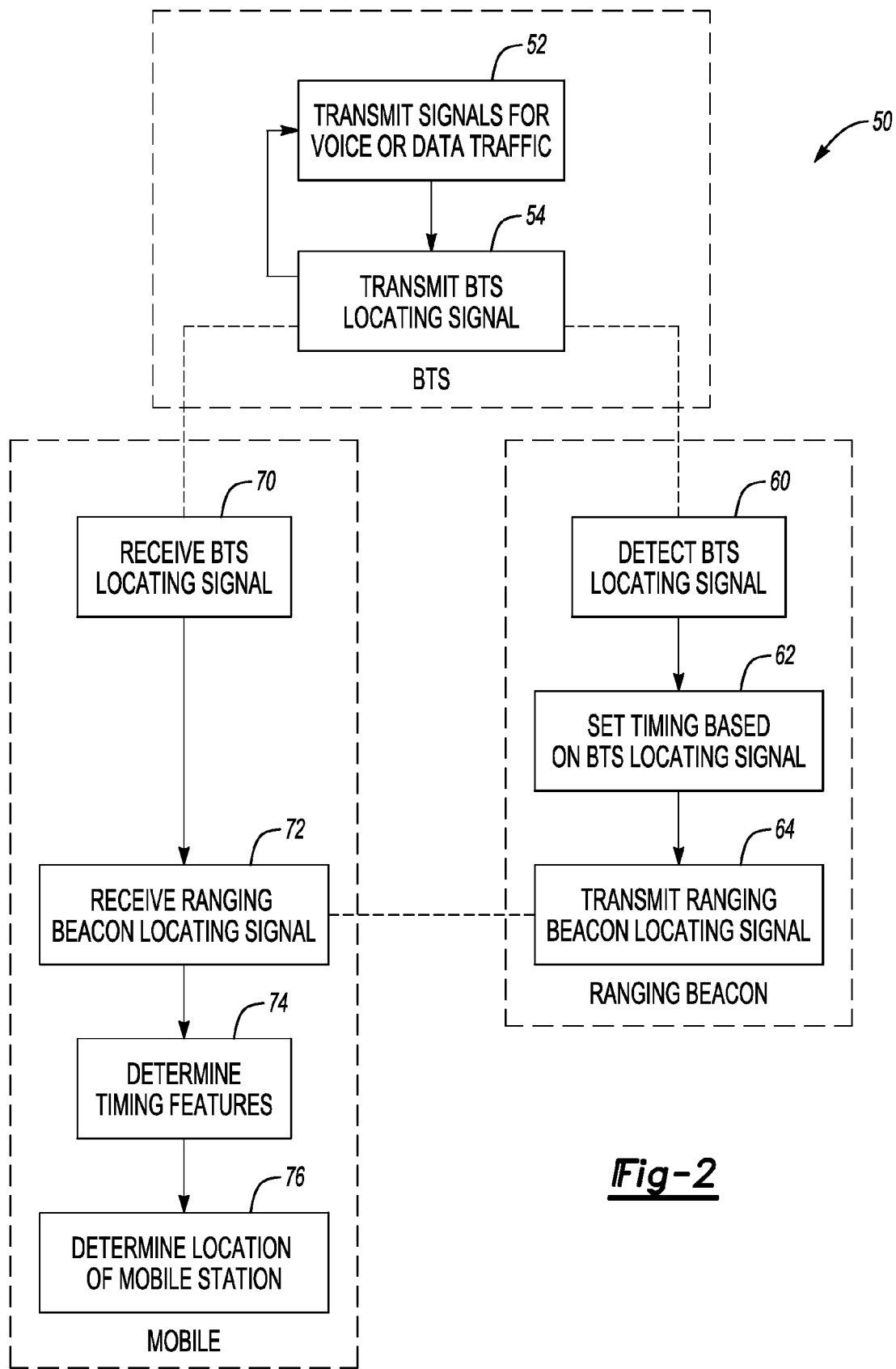
FIG. 2 is a flowchart diagram summarizing one example approach.

FIG. 2 includes a flowchart diagram 50 summarizing one example approach. FIG. 2 is organized to show the mobile station operation in the box on the left, the BTS operation in the box in the middle and a ranging beacon transmitter operation in the box on the right. At 52, a BTS (e.g., the BTS 30) transmits signals that are used for voice, data or other wireless communication traffic. Such signal transmissions are associated with known wireless communication systems. At 54, the BTS also transmits a BTS locating signal that includes ranging signals and information regarding the location (e.g., coordinates such as longitude and latitude) of the BTS. In one example, each BTS periodically transmits the locating signal on a scheduled basis. In one example, the traffic signals associated with voice or data communications are transmitted during a first interval and the locating signals are transmitted during a second, different interval. In one example, the locating signal is transmitted by a BTS approximately every second. The interval during which the locating signal is transmitted may last for one frame, for example (e.g., 20 milliseconds). Scheduling the intervals during which traffic signals are communicated and locating signals are communicated can be customized depending upon the desire for a particular level of traffic communication capacity on the one hand and mobile station locating capacity on the other hand. Given this description, those skilled in the art will be able to decide what type of schedule will work best for their particular situation.

In one example, every BTS within a given region will be scheduled to transmit the locating signal at the same time. This allows for a mobile station to receive simultaneously transmitted locating signals from a plurality of BTSs so that each of the received signals may be used for purposes of making a location determination regarding the location of the mobile station.

In one example, the ranging beacon transmitters (e.g., the devices 40, 42 and 44) transmit their locating signals at the same time that the BTSs transmit their locating signals. One example strategy for accomplishing this is summarized in FIG. 2. At 60, the ranging beacon transmitter devices 40, 42 and 44 detect a transmitted locating signal from at least one of the BTSs 30, 32. Once receiving a BTS locating signal, the ranging beacon transmitters in this example are configured to be able to coordinate their own locating signal transmissions with those of the BTS. At 62, the ranging beacon transmitters set their signal transmission timing based on that of the BTS locating signal. The ranging beacon transmitters learn their time synchronization by receiving BTS location signals and accounting for the known distance between the BTS and the ranging beacon transmitter. In some examples, the ranging beacon transmitters compensate for time-of-flight when making synchronization determinations. In one example, the ranging beacon transmitters align their clocks with the corresponding BTS (or BTSs) and synchronize the timing of the transmission of the ranging beacon locating signals with the transmission of the BTS locating signals. At 64, the ranging beacon transmitters transmit their ranging beacon locating signals, each including information regarding the location of the corresponding signal source (e.g., coordinates such as longitude, latitude and elevation).

FIG. 2 also illustrates what occurs at the mobile station 22, for example. At 70, the mobile station receives the BTS locating signal from all BTS that are within appropriate range of the mobile station. At 72, the mobile station receives additional ranging beacon locating signals from a plurality of ranging beacon transmitters (e.g., 40, 42 and 44). The ranging beacon transmitters in many examples are strategically arranged so that a mobile station within a particular geographic area will be able to detect ranging beacon signals from a plurality of them to provide a sufficient number of signals to the mobile station for making a geo-location determination.

At 74, a locator module 75 of the mobile station determines one or more features of the received signals such as timing, angle, power, etc. Example timing features include the signal time-of-arrival, time-difference-of-arrival or round-trip time-of-arrival. The mobile station in some examples uses angle or signal strength information as part of the positioning solution. Otherwise, a known geo-location algorithm based upon the received signals and the supplied location information regarding the signal sources allows for the mobile station 22 to make a location determination at 76.

Once determined at 76, the location of the mobile station can be provided in a manner that suits the needs of a particular situation. For example, during an emergency 911 call the mobile station can provide a signal indicating the mobile station's current location. This location information will then be forwarded to the appropriate authority who facilitates responding to the emergency call.

In some examples, the mobile station will continuously monitor its location by repeatedly detecting locating signals and making a corresponding location determination. In another example, the mobile station will make a location determination based upon some action required by the mobile subscriber such as placing an emergency 911 call or a menu selection requesting a map of the local vicinity.

In the above example, the mobile station 22 includes suitable programming and processing capability for making the mobile station location determination. In another example, a locating signal is transmitted by the mobile station and received by the BTSs and ranging beacon devices, respectively. Timing information regarding the locating signal received at each such device and the known location of those devices allows for a centralized locating device that is in communication with the BTSs and ranging beacon devices to make the mobile station location determination. In such a situation, that location information may be provided to the currently serving BTS for the mobile station. The location information may also be forwarded to the mobile station for a variety of purposes.

Those skilled in the art who have the benefit of this description will appreciate how communicating a signal between a BTS, a ranging beacon device and a mobile station may occur in one or both directions for purposes of facilitating locating the mobile station. It should be noted that a device is considered to communicate a locating signal for purposes of this description if the device transmits or receives the locating signal. Additionally, a transmitter communicates the locating signal by transmitting it even if it is not actually received by another device.

Figure 3:
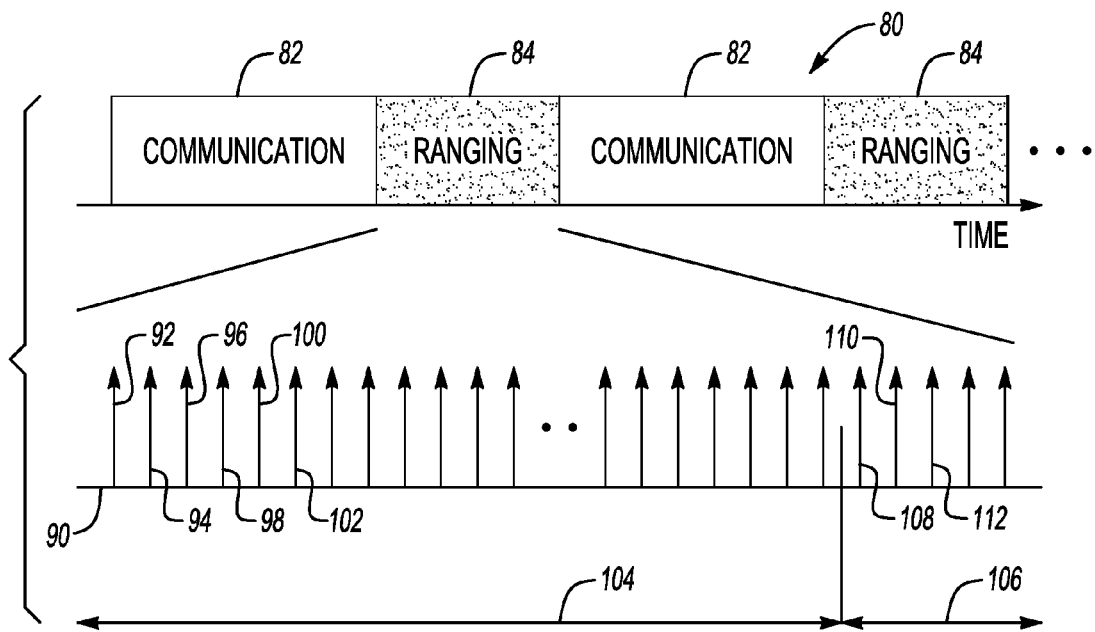
FIG. 3 schematically illustrates a signaling strategy used in one example embodiment.

In one example, the simultaneous transmission of the locating signals does not introduce undesirable interference or is planned to minimize any mutual interference. One example includes using orthogonal frequency division multiplexing for a cellular downlink transmission of the locating signals. FIG. 3 schematically shows one example approach. Signal transmission scheduling 80 includes intervals 82 during which a BTS transmits user traffic signals associated with voice or data traffic, for example. Other intervals 84 are dedicated to locating signal transmissions. During the intervals 84, the locating signals are transmitted by the BTSs and ranging beacon transmitters.

The locating signals in this example include known pilot signals from the BTSs and the ranging beacon transmitters. The bandwidth used for the locating signal transmissions is schematically shown at 90. This bandwidth is divided into a plurality of tones such as those shown at 92-102. Each source in this example transmits a wide band signal at 104 and a low rate, low bandwidth signal portion at 106. In this example, the low rate, low bandwidth portion 106 is used for providing the source location information.

The illustrated example is designed to support up to six distinct ranging signals. Each ranging signal is transmitted on a respective tone. In this example, the six signals are sent on more than one tone each. For example, the tone 92 is used by one source (e.g., one of the BTSs) and the tones 94, 96, 98, 100 and 102 are each used by a respective ranging beacon transmitter. The next six tones are similarly assigned. Each successive set of six tones is assigned this way, until all tones are used. In this example, each ranging signal is transmitted on every sixth tone such that all tones are used.

The same tones may also be re-used by transmitters that are a sufficient distance away from another set of transmitters so that there is not any interference.

The pilot signals transmitted on the tones in the wide bandwidth portion 104 do not significantly interfere under normal orthogonal frequency division multiplexing signal conditions. Such an arrangement avoids near-far interference between up to six location sources yet maintains a wide band ranging signal. A wide band signal is desirable for location accuracy. A wider band signal avoids reduced accuracy that is otherwise associated with the time shifting and offset associated with rounding off edges of smaller bandwidth signals.

In the illustrated example, each of the sources of a location signal uses one of the tones 108, 110, 112, for example, on which to transmit its position information. In one example, the ranging beacon transmitters only transmit during the ranging time slot shown at 104 and 106 on their assigned tone or tones.

The combined traffic communication and location communication arrangement allows for greater efficiency than a dedicated positioning system that occupies the full radio frequency bandwidth by continuously providing only position information signals. The example strategy allows for taking advantage of the radio frequency capabilities of existing BTS devices and providing signals for locating mobile stations while still providing for subscriber traffic communications.

Figure 4:
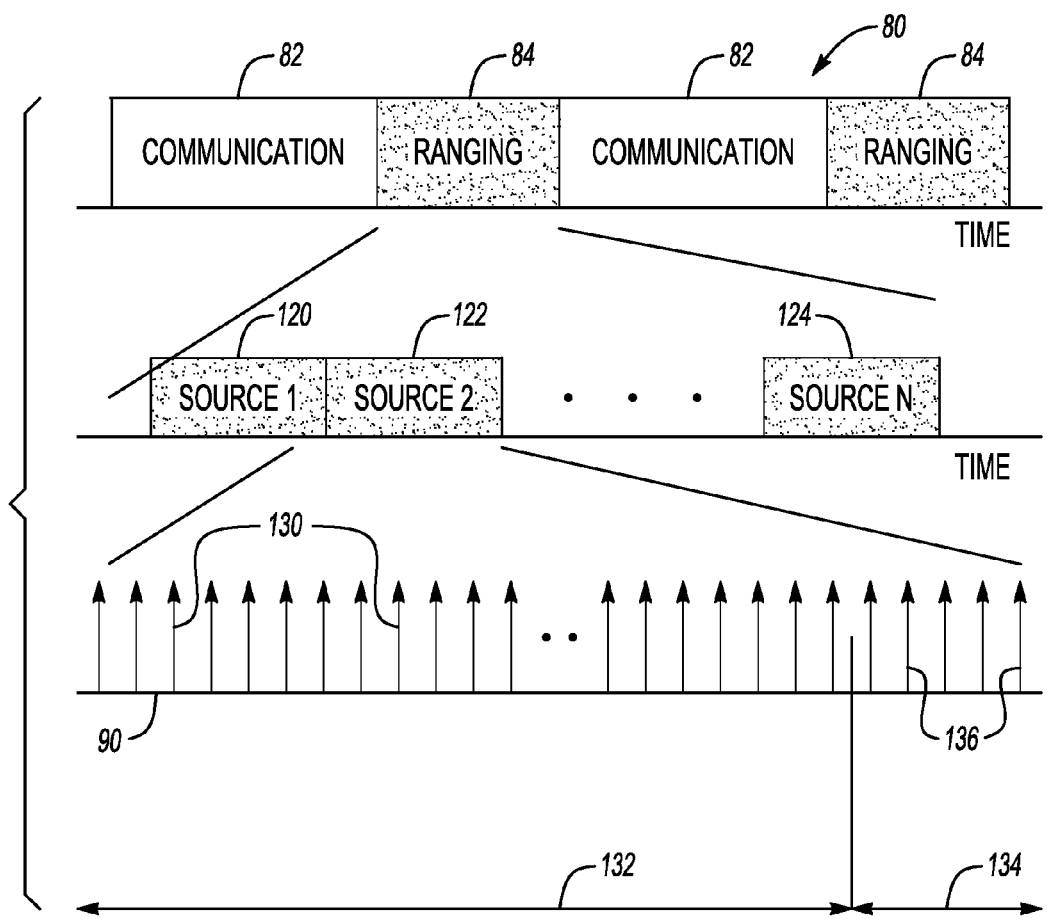
FIG. 4 schematically illustrates a signaling strategy used in another example embodiment.

FIG. 4 schematically shows another strategy that includes time division multiplexing in addition to orthogonal frequency division multiplexing. In this example, the intervals 84 during which locating signals are transmitted are divided into time sequences 120, 122 and 124 with each sequence being dedicated to a particular transmitter of a locating signal. During each of the time segments 120, 122 and 124, a particular transmitter utilizes all of the tones 130 in a wide bandwidth portion 132 of the available bandwidth 90. A more narrow portion 134 of the bandwidth includes a plurality of tones 136 that are used for transmitting source location information. In this example, each transmitter uses all of the available tones during the time segment assigned to that transmitter.

Another example includes a circuit-switched CDMA radio system. In this example, the pilot channel is used as the ranging signal and BTS coordinates are transmitted on a common broadcast channel such as a paging channel. In this example, the ranging beacon transmitters (e.g., 40, 42, 44) are assigned long spreading codes but do not respond to communication requests from mobile stations. In such an example, the transmitted power levels are set to balance coverage and potential interference.

In another example, the CDMA radio system is packet-oriented. In such an example, ranging packets are occasionally transmitted on a downlink. The ranging packets contain only a known pilot burst. The BTS location information is sent on a common broadcast channel. In this example, the ranging beacon transmitters also transmit their locating signals in this format and do not respond to any uplink messages from a mobile station. In this example, the transmit power is also adjusted to carefully balance coverage versus interference.

The disclosed examples demonstrate how embodiments of this invention use the cellular radio spectrum for communication and geo-location functions. Cellular base stations can work in concert to transmit signals suitable for mobile station location while also fulfilling their normal traffic communication functions in the cellular network. The disclosed examples allow for dividing up radio frequency resources between communication (e.g., traffic) and location signaling while minimizing interference between the two.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:
1. A method of facilitating locating a wireless communication mobile station, comprising the steps of:
communicating at least one first signal from a base station transceiver that is also used for other wireless communication with the mobile station, the first signal including information regarding a location of the base station transceiver;
communicating a plurality of second signals from a corresponding plurality of ranging beacon transmitters, the second signals each including information regarding a location of the corresponding ranging beacon transmitter; and
using the first and second signals to facilitate locating a mobile station;

receiving previously transmitted first signals at one of the plurality of ranging beacon transmitters;

determining a timing of transmission of the first signal from the base station transceiver based on the received previously transmitted first signals; and synchronizing a timing for transmitting the second signal from the one of the ranging beacon transmitters with the timing of transmission of the first signal based on the determined timing; and wherein the at least one first signal is transmitted from the base station transceiver simultaneously with the second signal transmitted from the one of the plurality of ranging beacon transmitters.

2. The method of claim 1, comprising receiving the at least one first signal and the second signals at the mobile station; and determining the location of the mobile station based on the information included in the received signals.

3. The method of claim 2, comprising determining received signal timing information comprising at least one of (i) a time of arrival of the received signals, (ii) a time-difference-of-arrival of the received signals or (iii) a round trip time of arrival of the received signals; and using the determined received signal timing information for determining the location of the mobile station.

4. The method of claim 2, comprising receiving at least four signals including the at least one first signal and the plurality of second signals, wherein the received signals are all transmitted simultaneously.

5. The method of claim 1, comprising transmitting the at least one first signal from the base station transceiver simultaneously with transmitting the plurality of second signals from the corresponding plurality of ranging beacon transmitters.

6. The method of claim 1, comprising transmitting the first signal from the base station transceiver during a first interval; and transmitting signals from the base station transceiver comprising user traffic during a second, different interval.

7. The method of claim 6, wherein the first and second intervals are repeated such that the base station transceiver periodically transmits the first signal.

8. The method of claim 6, comprising transmitting the second signal from at least one of the ranging beacon transmitters only during the first interval.

9. The method of claim 1, wherein the first and second signals each comprises a pilot signal portion and a source location portion.

10. The method of claim 1, wherein a bandwidth used for communicating the first and second signals is divided into a plurality of tones and the method comprises using each of the tones, respectively, for one of (i) the first signal or (ii) one of the plurality of second signals.

11. The method of claim 1, wherein a bandwidth used for communicating the first and second signals is divided into a plurality of tones and an interval for communicating the first and second signals is divided into a plurality of segments and wherein the method comprises using each of the segments, respectively, for (i) one of the first signal or (ii) one of the plurality of second signals; and using all of the tones during the corresponding segment for the (i) one of the first signal or (ii) the one of the plurality of second signals.

12. The method of claim 1, wherein the first signal comprises a pilot channel ranging signal and the information regarding the base station transceiver location is communicated on a broadcast channel.

13. The method of claim 12, wherein the ranging beacon transmitters are assigned long spreading codes.

14. The method of claim 1, comprising communicating downlink packets including the first signal in at least one packet that contains a known pilot burst; and broadcasting the base station transceiver location information on a broadcast channel.

15. A wireless communication system, comprising at least one base station transceiver that transmits a first signal including information regarding a location of the base station transceiver during a first interval and transmits signals comprising user traffic during a second interval; and a plurality of ranging beacon transmitters that each transmit a second signal including information regarding a location of the corresponding ranging beacon transmitter during the first interval;

wherein a location of a receiver of the first signal and the second signals can be determined from the first and second signals;

wherein the base station transceiver and the plurality of ranging beacon transmitters simultaneously transmit the first and second signals; and wherein the ranging beacon transmitters learn a timing of the first signal by at least receiving the first signal from the base station transceiver, the ranging beacon transmitters automatically synchronizing a timing of the second signals with the timing of the first signal.

16. The system of claim 15, wherein the at least one base station transceiver receives a signal from a mobile station and each of the plurality of ranging beacon transmitters receive the signal from the mobile station and a location of the mobile station is determined from the signal received by the base station transceiver and the ranging beacon transmitters.

17. A mobile station device, comprising a receiver that is configured to receive a first signal from a base station transceiver that includes information regarding a location of the base station transceiver, the receiver also being configured to receive other wireless communication signals from the base station transceiver, the receiver also being configured to receive a plurality of second signals from a corresponding plurality of ranging beacon transmitters, the second signals each including information regarding a location of the corresponding ranging beacon transmitter; and a locator module that determines a location of the mobile station device based upon received first and second signals;

the ranging beacon transmitters having learned a timing of the first signal by at least receiving the first signal from the base station transceiver, the ranging beacon transmitters automatically synchronizing a timing of the second signals with the timing of the first signal such that the base station transceiver and the plurality of ranging beacon transmitters simultaneously transmit the first and second signals.

* * * * *